United States Patent Office 3,308,088
Patented Mar. 7, 1967

3,308,088
SILICON RESIN VARNISHES CONTAINING CO-
BALT AND CHROMIUM COMPLEXES
Tamotsu Wada, Kita-ku, Tokyo, and Mitsuo Ishizaka,
Kohoku-ku, Yokohama-shi, Japan, assignors to Tokyo
Shibaura Electric Co., Ltd., Kawasaki-shi, Japan, a
corporation of Japan
No Drawing. Filed Mar. 26, 1964, Ser. No. 355,082
14 Claims. (Cl. 260—33.4)

This invention relates to silicone varnishes and methods of preparing the same, and more particularly to a novel silicone varnish which can be dried at a low temperature, and to a method of preparing the same by employing new compounds which have not yet been utilized.

In order to provide sufficient mechanical and electrical properties to silicone varnishes in addition to their superior heat resistance, it has been required to bake the varnishes for a longer period and at a relatively higher temperature (i.e. at 200° to 250° C.) when compared with conventional organic varnishes. This is one of the important problems encountered when applying silicone varnishes to electric machines and apparatus as their insulating material.

A number of investigations have been made to solve this problem. According to one approach, the composition of silicone varnishes was selected to contain more trifunctional radicals. According to another approach, strong basic substances were incorporated as drying accelerators to improve drying properties including salts of organic acids of lead, zinc, iron, cobalt, nickel, tin and the like; or amines such as butylamine, triethanolamine and the like; or hydroxides such as tetraalkyl ammonium hydroxide and tetraalkyl phosphinium hydroxide. With the first approach while it is possible to dry the silicone varnish at a relatively low temperature in a range from room temperature to 150° C., dried films are not only brittle and less flexible but also exhibit adhesive properties when heated to elevated temperatures so that they are not suitable for practical use. When a metal salt of an organic acid is incorporated according to the second approach, not only the shelf stability of the varnishes is impaired but also deterioration of the dry varnish films formed is greatly accelerated, depending upon the type of metals used. Further, when incorporating amines good results can not be expected unless using a large quantity, which also impairs the shelf stability and heat resistance of the varnish. Incorporation of strong basic materials also results in lowering the shelf stability as well as deterioration of the coated films. These tendencies are most pronounced when inorganic basic materials are used. It is also known in the art to add an organic acid such as acetic acid to an organic basic material or to incorporate it in the form of a neutralized salt in order to improve the shelf stability of the varnishes. According to this method, varnishes can be obtained which can be dried at a relatively low temperature of from room temperature to about 150° C. without impairing the heat resistant properties of the coated films, but owing to its high decomposition temperature, the drying accelerator may remain in the undecomposed state thus effecting the electrical properties, more particularly, the dielectric loss tangent properties of the coated films at elevated temperatures.

Accordingly, one of the objects of this invention is to provide silicone varnishes which can be dried in a short time by treating them at a relatively low temperature of from room temperature to about 150° C. thereby forming films having excellent electrical properties.

Further objects of this invention are to provide novel silicone varnishes which can provide films having excellent flexibility and heat resistance by heat treatment for a short interval and at a relatively low temperature.

Still further objects of this invention are to provide silicone varnishes having good stability and which can maintain this property over a long period of time during storing.

According to this invention these and other objects can be attained by incorporating a suitable amount of a polynuclear complex compound into a solution of an organopolysiloxane resin.

According to the method of this invention, a polysiloxane resin composition represented by a general formula

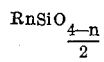

(where R represents an organic group including an alkyl group, i.e. methyl group, ethyl group, propyl group, butyl group and the like; a phenyl group; an alkenyl group, i.e. vinyl group, allyl group and the like; and an aryl group, i.e. naphtyl group, anthracyl group, tolyl group, xylyl group, ethylphenyl group and the like, and n is equal to 1 to 2) is prepared by hydrolizing and polymerizing a mixture of chlorosilanes; the polysiloxane resin composition is then dissolved in a suitable solvent selected from the group consisting of benzene, toluene, xylene, propyl alcohol, butyl alcohol, methylisobutyl carbinol and diacetone alcohol to give a solution of the organopolysiloxane resin having a desired concentration from 0.1 to 3.0%, preferably 0.3 to 2.0%, by weight, based on the weight of the resin composition, of a polynuclear complex compound represented by a general formula [MaXbYc]Zd (where M represents an atom of a core metal selected from the group consisting of cobalt, chromium and platinum; X represents a ligand, i.e. ammonia, ethylene diamine (en), water and the like; Y represents a bridging group interconnecting core metals such as a hydroxo group (OH), imido group (NH), amido group (NH$_2$), acetato group (CH$_3$COO) and the like; Z represents a hydroxyl or organic acid radical; $a$ represents the number of core metals, i.e. from 2 to 4; $b$ the number of ligand; $c$ the number of bridging groups; and $d$ the number of acid radicals) is incorporated into said resin solution as the drying accelerator. This method provides silicone varnishes which can form films having short curing times, excellent storage stability, and good electrical properties at elevated temperatures.

The polynuclear compounds adapted to be incorporated into the polysiloxane resin solution in accordance with this invention can be prepared by causing a reaction between a chlorinated compound, for instance,

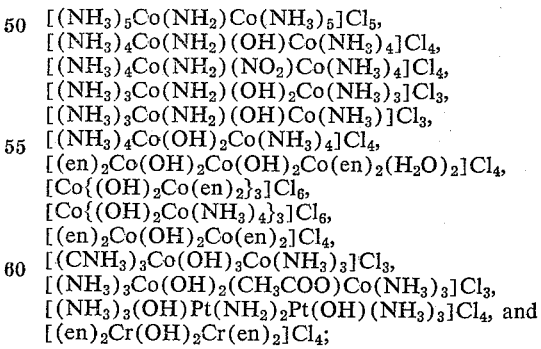

and silver oxide or silver acetate or by causing a reaction between a sulphate such as

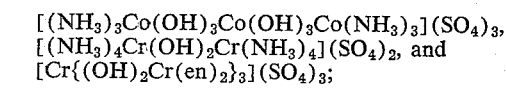

and barium hydroxide or barium acetate. As can be noted from the illustrated compounds, both the ligand to be coordinated with the atom of the core metal and the bridging group interconnecting atoms of said core metal in the polynuclear complex compound represented by the general formula [MaXbYc]Zd may be one type or a combination of two or more types. Numbers of said suffixes $a$, $b$, $c$ and $d$ are determined dependent upon the types and numbers of the atoms of the core metal, ligands and the bridging groups. In carrying out the method of this invention, where the compounded polynuclear complex compound is a hydroxide, it is advantageous to add a monobasic organic acid, such as acetic acid, formic acid, propionic acid, caprylic acid, caproic acid, octylic acid, oleic acid and stearic acid or a dibasic organic acid such as oxalic acid, malonic acid and succinic acid concurrently with said hydroxide or at a different time at which said complex compound is incorporated, thus further improving the shelf stability without affecting to any extent the heat resistant as well as the electrical properties of dried films. The amount of organic acid incorporated is not necessarily equal to that of said hydroxide. When less than 0.1%, by weight based on the resin component of the resin solution, of said polynuclear complex compound is incorporated into the polysiloxane resin solution, the resulting drying property is rather poor whereas use of the complex compound in excess of 3.0% by weight results in the same drying property but merely increases cost. It is to be understood that the above mentioned drying accelerator may be used in addition to a conventional drying accelerator, for example, an organic salt of said metals.

Even polysiloxane resin solutions which normally require drying periods of over one hour at elevated temperatures of from 200° to 250° C. can be dried at a lower temperature of from room temperature to 150° C. and within shorter times when incorporated with the said polynuclear complex compound according to this invention. Accordingly, coated films of the silicone varnish can be easily dried by simple heating means such as infrared ray lamps, thus greatly simplifying the drying process. In addition, the silicone varnish of this invention may be used safely for electric apparatus utilizing materials which can not withstand a temperature in excess of 200° C., for example. Moreover, while films formed from this varnish have no tendency to become adhesive when subjected to an elevated temperature of 250° C., for example, once dried at low temperature as above described, said polynuclear complex compounds easily decompose at low temperature thus providing coated films having superior electrical and heat resistant properties. The silicone varnishes of this invention have excellent drying properties and shelf stability which should be compared with conventional silicone varnishes having poor shelf stability.

Following examples are given by way of illustration and not limitation.

*Example 1*

A mixed solvent comprising xylene and butanol (1:1) was added to three types of polysiloxane resins, each having a composition (A) $\quad \frac{R}{Si}=1.70, \frac{CH_3}{C_6H_5}=1.50$ (B) $\quad \frac{R}{Si}=1.56, \frac{CH_3}{C_6H_5}=1.37$ and (C) $\quad \frac{R}{Si}=1.47, \frac{CH_3}{C_6H_5}=1.27$ respectively (where R represents a $CH_3$ group and a $C_6H_5$ group) and the resin solutions were diluted to contain 60%, by weight, of resin component in each case. A polynuclear complex compound $$[(NH_3)_4Co(OH_2)Co(NH_3)_4](CH_3COO)_4$$

prepared by adding an equivalent amount of acetic acid to a polynuclear complex hydroxide which had been synthesized by reacting $$(NH_3)_4Co(OH)_2Co(NH_3)_4(SO_4)_2$$

and barium hydroxide was added to each of said solutions as the drying accelerator to obtain three types of silicone varnishes.

The Table 1 below shows test results of drying, heat resistant and electric properties of these three silicone varnishes and a silicone varnish to which no drying accelerator was added, said test was made according to JIS (Japanese Industrial Standards) C2122.

TABLE 1

| Items of test | Varnish Samples | | | | | |
|---|---|---|---|---|---|---|
| | A | | B | | C | |
| Amount of drying accelerator added, percent.[1] | 0 | 1.0 | 0 | 0.5 | 0 | 0.5. |
| Drying property: To be tack free at 25° C. | 250° C., over 6 hrs. | 200° C., 3 hrs. | 150° C., 1 hour | 150° C., 30 min. | 150° C., 10 min. | 100° C., 20 min. |
| Heat adhesive property:[2] To be tack free at 200° C. | do | 200° C., 4 hrs. | 200° C., 3 hrs. | 150° C., 1 hr. | 150° C., over 6 hrs. | 100° C., 1 hr. |
| Weight loss (250° C., 72 hours, percent) | 5.8 | 5.5 | 7.2 | 6.3 | 8.5 | 6.5. |
| Flex Life (250° C., 3 mm. φ) | Over 1,000 hrs. | Over 1,000 hrs. | 300 hrs. | 300 hrs. | 50 hrs. | 50 hrs. |
| Dielectric strength (kv./0.1 mm.): | | | | | | |
| Dry | 8.3 | 8.0 | 8.2 | 8.1 | 7.8 | 7.5. |
| After immersion in water for 24 hours. | 7.7 | 7.7 | 8.3 | 7.8 | 7.5 | 7.7. |
| Volume Resistivity (ohm-cm.): | | | | | | |
| Dry | Over $10^{16}$ | Over $10^{16}$ | Over $10^{16}$ | Over $10^{16}$ | Over $10^{16}$ | Over $10^{16}$. |
| After immersion in water for 24 hours. | do | do | do | do | do | Do. |
| Dielectric constant: | | | | | | |
| 25° C. | 3.2 | 3.2 | 3.0 | 3.1 | 3.0 | 3.0. |
| 180° C. | 2.7 | 2.6 | 2.5 | 2.1 | 2.6 | 2.6. |
| Dielectric loss tangent (percent): | | | | | | |
| 25° C. | 0.5 | 0.7 | 0.3 | 0.5 | 0.4 | 0.6. |
| 180° C. | 1.3 | 2.5 | 1.0 | 0.7 | 0.9 | 2.1. |
| Storage stability | Did not gel after standing for 6 months at room temperature. | | | | | |

[1] Percents, by weight, based on the resin component of the varnish.
[2] A drying condition wherein an asbestos paper of a size 0.3 mm. x 25.4 mm. x 100 mm. is placed on a dried test piece and an iron piece (125 g.) of a size 25 mm. x 25 mm. x 25 mm. is placed on the asbestos paper and the hot asbestos can freely fall off after being heated at 200° C. for 15 minutes.

As can be clearly noted from this example, this invention enables a reduction in drying temperature by about 50° C. and also a decrease in drying time. These dried films not only exhibit adhesive property at an elevated temperature of from 200° to 250° C. but also have low weight loss without affecting heat resistant and electrical properties as well as shelf stability.

*Example 2*

0.5%, by weight, based on the resin composition of the solution, of a drying accelerator $$[(en)_2Co(OH)Co_2(OH)_2Co(en)_2(H_2O)_2](CH_3COO)_4$$

which was synthesized from $$[(en)_2Co(OH)_2Co(OH)_2Co(en)_2(H_2O)_2]Cl_4$$

and silver acetate, was added to the polysiloxane resin solution (B) of Example 1 and tested by the same method of testing as in Example 1, and it was found that the film was dried in 15 minutes at 150° C. and had a flex life (3 mm. φ) of 500 hours at 250° C.

*Example 3*

[Co{(OH)$_2$Co(en)$_2$}$_3$]Cl$_6$ was synthesized from cobalt chloride and ethylenediamine and the polynuclear complex chloride was reacted with silver acetate to obtain a drying accelerator

[Co{(OH)$_2$Co(en)$_2$}$_3$](CH$_3$COO)$_6$

This drying accelerator was added to the polysiloxane resin solution B of Example 1, respectively in an amount of 0.3, 0.5, 1.0 and 2.0%, by weight, based on the resin component of said solution. Table 2 below shows the test results of drying properties of various varnishes according to the same method of testing as described in Example 1.

TABLE 2

| Drying property | Amount of drying accelerator added, percent | | | |
| --- | --- | --- | --- | --- |
| | 0.3 | 0.5 | 1.0 | 2.0 |
| Drying temperature and drying time: | | | | |
| 90° C | 5 hrs | 3 hrs | 2 hrs | 1.5 hrs. |
| 110° C | 2 hrs | 1.5 hrs | 1 hr | 50 min. |
| 130° C | 1 hr | 40 min | 30 min | 20 min. |
| 150° C | 40 min | 20 min | 15 min | 10 min. |

The flex life of these varnishes was over 500 hours at 250° C. (3 mm. φ) and their dielectric strength and volume resistivity were also excellent.

*Example 4*

[Cr{(OH)$_2$Cr(en)$_2$}$_3$](SO$_4$)$_3$ was synthesized from aluminum chloride and ethylene diamine and the polynuclear complex sulphate was reacted with barium acetate to obtain a drying accelerator

[{(OH)$_2$Cr(en)$_2$}$_3$](CH$_3$COO)$_6$

Thereafter, the drying accelerator was added to the polysiloxane resin solution C of Example 1 in an amount of 0.5%, by weight, based on the resin component of said resin solution, and tested by the same method as was used in Example 1. Film was dried within 30 minutes at 100° C. and a film dried at 100° C. for 2 hours did not show any heat adhesive property at 200° C. Weight loss after heating at 250° C. for 72 hours was 6.0%; flex life was 50 hours at 250° C. (3 mm. φ) which was found to be equal to that of films containing no drying accelerator. The electrical property and the shelf stability were also excellent.

*Example 5*

[(en)$_2$Co(OH)$_2$Co(en)$_2$](CH$_3$COO)$_4$ was synthesized from

[(en)$_2$Co(OH)$_2$Co(en)$_2$]Cl$_4$ and silver acetate and the complex compound was added to the polysiloxane resin solution B of Example 1 in an amount of 1.0%, by weight based on the resin component of said resin solution, and tested by the same method as was used in Example 1. The film was dried within 10 minutes at 150° C. and 30 minutes at 130° C. The flex life was over 300 hours at 250° C. (3 mm. φ). This varnish did not gell after standing over 3 months at room temperature.

*Example 6*

[(NH$_3$)$_4$Cr(OH)$_2$Cr(NH$_3$)$_4$](CH$_3$COO)$_4$ synthesized from

[(NH$_3$)$_4$Cr(OH)$_2$Cr(NH$_3$)$_4$](SO$_4$)$_2$ and barium acetate was incorporated into the polysiloxane resin solution B of Example 1 in an amount of 0.5%, by weight based on the resin component of said resin solution, and tested by the same method as in Example 1. It was found that the film was dried within 20 minutes at 150° C. and that the film which was dried at 150° C. for one hour did not show any heat adhesive property at 200° C. Their electrical and heat resistant properties were excellent.

*Example 7*

[(NH$_3$)$_4$Co(NH$_2$)(OH)Co(NH$_3$)$_4$](CH$_3$COO)$_4$ synthesized from

[(NH$_3$)$_4$Co(NH$_2$)(OH)Co(NH$_3$)$_4$]Cl$_4$ and silver acetate was added to the polysiloxane resin solution B of Example 1 in an amount of 0.5%, by weight based on the resin component of said resin solution, and tested by the same method as in Example 1. It was found that the film was dried within 10 minutes at 150° C. and that the flex life of a film dried at 130° C. for 30 minutes was 400 hours at 250° C. (3 mm. φ).

*Example 8*

[(NH$_3$)$_3$Co(OH)$_2$(CH$_3$COO)Co(NH$_3$)$_3$](CH$_3$COO)$_3$ synthesized from

[(NH$_3$)$_3$Co(OH)$_2$(CH$_3$COO)Co(NH$_3$)$_3$]Cl$_3$ and silver acetate was added to the polysiloxane resin solution C of Example 1 in an amount of 0.5%, by weight based on the resin component of said solution, and tested by the same method as in Example 1. The film was dried within 30 minutes at 100° C. and had good electrical property and shelf stability.

What is claimed is:

1. A silicone varnish comprising a solution of an organopolysiloane resin represented by a general formula $$R_nSiO_{\frac{4-n}{2}}$$

(where R represents a CH$_3$ group and a C$_6$H$_5$ group and $n=1$ to 2) and a drying accelerator consisting of a polynuclear complex compound represented by a general formula [M$_a$X$_b$Y$_c$]Z$_d$ (where M represents the atom of a core metal having a coordination number of six and selected from a group consisting of Co and Cr, X a ligand selected from a group consisting of ammonia, ethylenediamine and water, Y is a bridging group interconnecting core metal atoms and selected from a group consisting of hydroxo group, imido group, amido group and acetate group, Z an acetic acid group, $a$ the number of core metals and is equal to from 2 to 4, $b$ the number of ligands, $c$ the number of bridging groups and $d$ the number of acetic acid groups) said polynuclear compound being present in said solution in an amount of 0.3 to 2.0% by weight, based on the resin component of said solution.

2. A silicone varnish comprising a solvent consisting of xylene and butanol in the ratio of 1:1, an organopolysiloxane represented by a general formula $$R_nSiO_{\frac{4-n}{2}}$$

(where R represents a CH$_3$ group and a C$_6$H$_5$ group, $n=R/Si=1.70$ and CH$_3$/C$_6$H$_5=1.50$) and

[(NH$_3$)$_4$Co(OH)$_2$Co(NH$_3$)$_4$](CH$_3$COO)$_4$ in an amount of 1.0% by weight based on the resin component of said resin solution.

3. A silicone varnish comprising a solvent consisting of xylene and butanol in the ratio of 1:1, an organopolysiloxane dissolved in said solvent and represented by a formula $$R_nSiO_{\frac{4-n}{2}}$$

(where R represents a CH$_3$ group and a C$_6$H$_5$ group, $n=R/Si=1.56$ and CH$_3$/C$_6$H$_5=1.37$) and

[(NH$_3$)$_4$Co(OH)$_2$Co(NH$_3$](CH$_3$COO)$_4$ ncorporated into the resulted resin solution in an amount of 0.5%, by weight, based on the resin component of said resin solution.

4. A silicone varnish comprising a solvent consisting of xylene and butanol in the ratio of 1:1, an organopolysiloxane resin dissolved in said solvent and represented by a general formula $$R_nSiO_{\frac{4-n}{2}}$$

(where R represents a $CH_3$ group and a $C_6H_5$ group, $n=R/Si=1.47$, and $CH_3/C_6H_5=1.27$) and $$[(NH_3)_4Co(OH)_2Co(NH_3)_4](CH_3COO)_4$$

incorporated into the resultant resin solution in an amount of 0.5%, by weight, based on the resin component of said resin solution.

5. A silicone varnish comprising a solvent consisting of xylene and butanol in the ratio of 1:1, a polysiloxane resin represented by a general formula $$R_nSiO_{\frac{4-n}{2}}$$

(where R represents a $CH_3$ group and a $C_6H_5$ group, $n=R/Si=1.56$ and $CH_3/C_6H_5=1.37$), a copolynuclear complex compound $$[(en)_2Co(OH)_2Co(OH)_2Co(en)_2(H_2O)_2](CH_3COO)_4$$

in an amount of 0.5%, by weight, based on the resin component of said resin solution.

6. A silicone varnish comprising a solvent consisting of xylene and butanol in the ratio of 1:1, an organopolysiloxane represented by a general formula $$R_nSiO_{\frac{4-n}{2}}$$

(where R represents a $CH_3$ group and a $C_6H_5$ group, $n=R/Si=1.56$ and $CH_3/C_6H_5=1.37$), a polynuclear complex compound $$[Co\{(OH)_2Co(en)_2\}_3](CH_3COO)_6$$

in an amount of 0.3%, by weight of the resin component of said resin solution.

7. The varnish according to claim 6 wherein said polynuclear complex compound is present in an amount of 0.5%, by weight, based on the resin component of said resin solution.

8. The varnish according to claim 6 wherein said polynuclear complex compound is present in an amount of 1.0%, by weight, based on the resin component of said resin solution.

9. The silicone varnish according to claim 1 wherein said polynuclear complex compound is present in an amount of 2%, by weight, based on the resin component of said polysiloxane resin solution.

10. A silicone resin comprising a solvent consisting of xylene and butanol in the ratio of 1:1, an organopolysiloxane represented by a general formula $$R_nSiO_{\frac{4-n}{2}}$$

(where R represents a $CH_3$ group and a $C_6H_5$ group, $n=R/Si=1.47$ and $CH_3/C_6H_5=1.27$), a polynuclear complex compound $$[Cr\{(OH)_2Cr(en)_2\}_3](CH_3COO)_6$$

in an amount of 0.5%, by weight, based on the resin component of said resin solution.

11. A silicone varnish comprising a solvent consisting of xylene and butanol in the ratio of 1:1, an organopolysiloxane resin represented by a general formula $$R_nSiO_{\frac{4-n}{2}}$$

(where R represents a $CH_3$ group and a $C_6H_5$ group, $n=R/Si=1.47$ and $CH_3/C_6H_5=1.27$), a polynuclear complex $$[(en)_2Co(OH)_2Co(en)_2](CH_3COO)_4$$

in an amount of 0.5%, by weight, based on the resin component of said resin solution.

12. A silicone varnish comprising a solvent consisting of xylene and butanol in the ratio of 1:1, a polysiloxane resin represented by a general formula $$R_nSiO_{\frac{4-n}{2}}$$

(where R represents a $CH_3$ group and a $C_6H_5$ group, $n=R/Si=1.56$ and $CH_3/C_6H_5=1.37$), a polynuclear complex compound $$[(NH_3)_4Cr(OH)_2Cr(NH_3)_4](CH_3COO)_4$$

in an amount of 0.5%, by weight, of the resin component of said resin solution.

13. A silicone varnish comprising a solvent consisting of xylene and butanol in the ratio of 1:1, an organopolysiloxane resin represented by a formula $$R_nSiO_{\frac{4-n}{2}}$$

(where R represents a $CH_3$ group and a $C_6H_5$ group, $n=R/Si=1.56$ and $CH_3/C_6H_5=1.37$), a polynuclear complex compound $$[(NH_3)_4Co(NH_2)(OH)Co(NH_3)_4](CH_3COO)_4$$

in an amount of 0.5%, by weight, based on the resin component of said resin solution.

14. A silicone varnish comprising a solvent consisting of xylene and butanol in the ration of 1:1, an organopolysiloxane resin represented by a formula $$R_nSiO_{\frac{4-n}{2}}$$

(where R represents a $CH_3$ group and a $C_6H_5$ group, $n=R/Si=1.47$ and $CH_3/C_6H_5=1.27$), a polynuclear complex compound $$[(NH_3)_3Co(OH)_2(CH_3COO)Co(NH_3)_3](CH_3COO)_3$$

in an amount of 0.5%, by weight, based on the resin component of said resin solution.

References Cited by the Examiner

UNITED STATES PATENTS 2,465,296   3/1949   Swiss _____ 260—46.5

OTHER REFERENCES

G. G. Freeman: "Silicones," Iliffe Books Ltd., London, 1962, pp. 48, 49, 55–57.

N. V. Sidgwick: "Chemical Elements and Their Compounds," vol. 11, Oxford University Press, 1950, pp. 1399–1403, 1415–1419 relied upon.

MORRIS LIEBMAN, *Primary Examiner.*

J. E. CALLAGHAN, *Assistant Examiner.*